United States Patent
Yang et al.

(10) Patent No.: US 9,244,877 B2
(45) Date of Patent: Jan. 26, 2016

(54) LINK LAYER VIRTUALIZATION IN SATA CONTROLLER

(71) Applicant: Intel Corporation, Santa Clara, CA (US)

(72) Inventors: Chengda Yang, Auburndale, MA (US);
Bradley A. Burres, Waltham, MA (US);
Amit Kumar, Hudson, MA (US);
Matthew J. Adiletta, Bolton, MA (US)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 13/804,207

(22) Filed: Mar. 14, 2013

(65) Prior Publication Data

US 2014/0281072 A1    Sep. 18, 2014

(51) Int. Cl.
*G06F 13/14* (2006.01)
*G06F 13/42* (2006.01)

(52) U.S. Cl.
CPC ............ *G06F 13/4295* (2013.01); *G06F 13/14* (2013.01)

(58) Field of Classification Search
USPC .......... 710/305, 306, 308, 313, 315, 316, 317
See application file for complete search history.

(56) References Cited

U.S. PATENT DOCUMENTS

| | | | |
|---|---|---|---|
| 7,539,797 B2 * | 5/2009 | Nemazie et al. ............... | 710/74 |
| 8,135,895 B2 | 3/2012 | Ji et al. | |
| 8,260,973 B2 | 9/2012 | Asnaashari et al. | |
| 2009/0276773 A1 * | 11/2009 | Brown et al. .................... | 718/1 |
| 2010/0057949 A1 * | 3/2010 | Weber ............................ | 710/22 |
| 2012/0054393 A1 * | 3/2012 | Yoshimura .................... | 710/110 |
| 2012/0166699 A1 * | 6/2012 | Kumar et al. ................. | 710/306 |
| 2012/0207156 A1 * | 8/2012 | Srinivasan et al. ............ | 370/389 |
| 2013/0198450 A1 * | 8/2013 | Malwankar et al. .......... | 711/114 |
| 2014/0006676 A1 * | 1/2014 | Chandrasekhar et al. .... | 710/316 |
| 2014/0059160 A1 * | 2/2014 | Chernoff et al. .............. | 709/217 |
| 2014/0173157 A1 * | 6/2014 | Shaw et al. ................... | 710/305 |

\* cited by examiner

*Primary Examiner* — Khanh Dang
(74) *Attorney, Agent, or Firm* — Chapin IP Law, LLC

(57) ABSTRACT

A SATA-compatible storage controller that can be configured to allow computers assigned to multiple different computer domains connected by at least one switch fabric to share resources of a common set of storage devices. The storage controller includes a plurality of virtual storage controllers, each providing an interface to a respective computer domain connected to the switch fabric, a virtualization mechanism configured to implement link layer virtualization for the common set of storage devices, and a split serial advanced technology attachment (SATA) protocol stack, the processing of which is partitioned between the respective virtual storage controllers and the virtualization mechanism.

22 Claims, 9 Drawing Sheets

Fig. 2 – Prior art

LINK LAYER VIRTUALIZATION IN SATA CONTROLLER

BACKGROUND

The present application relates generally to storage controllers, and more specifically to storage controllers having interfaces configured to allow computers assigned to multiple different computer domains connected by at least one switch fabric to share resources of a common set of storage devices. As employed herein, the term "computer domain" refers to a collection of central processing units (CPUs) whose memory addresses are under the same physical address spaces.

In a typical computer system, a group of computers assigned to a first computer domain can employ a storage controller to access an attached set of storage devices. For example, the set of storage devices may be a set of solid-state disks (SSDs) or magnetic hard disks (HDs). Further, the storage controller may be a serial advanced technology attachment (SATA) controller employing an advanced host controller interface (AHCI) to implement a bus adapter between the computers within the first computer domain and the set of disks. The computers within the first computer domain can share a common memory addressing space in coherent memory, and can be connected to the SATA controller via an internal bus, employing a single instance of a software driver to communicate with the SATA controller.

In the typical computer system described above, the computers within the first computer domain can be connected to at least one other group of computers assigned to at least a second computer domain. The computers within the second computer domain can be configured to request assistance from the computers within the first computer domain to gain access to the attached set of disks. Further, such requests for assistance to access the set of disks may be made using known resource sharing technologies such as network file system (NFS) technology, fibre channel (FC) technology, network-attached storage (NAS) technology, or storage area network (SAN) technology. In this way, groups of computers within multiple different computer domains can access a common set of disks concurrently at runtime to share data stored on the respective disks.

The known multi-root I/O virtualization (MR-IOV) specification might also be used for sharing data stored on a common set of disks among computers within multiple different computer domains. For example, using the known MR-IOV specification in the typical computer system described above, the internal bus may be configured to conform to the known Peripheral Component Interconnect express (PCIe) specification, and a specialized bus adapter, known as the "MR-IOV aware device", may be used to support multiple non-coherent host computers.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings.

DETAILED DESCRIPTION

Figure 1:
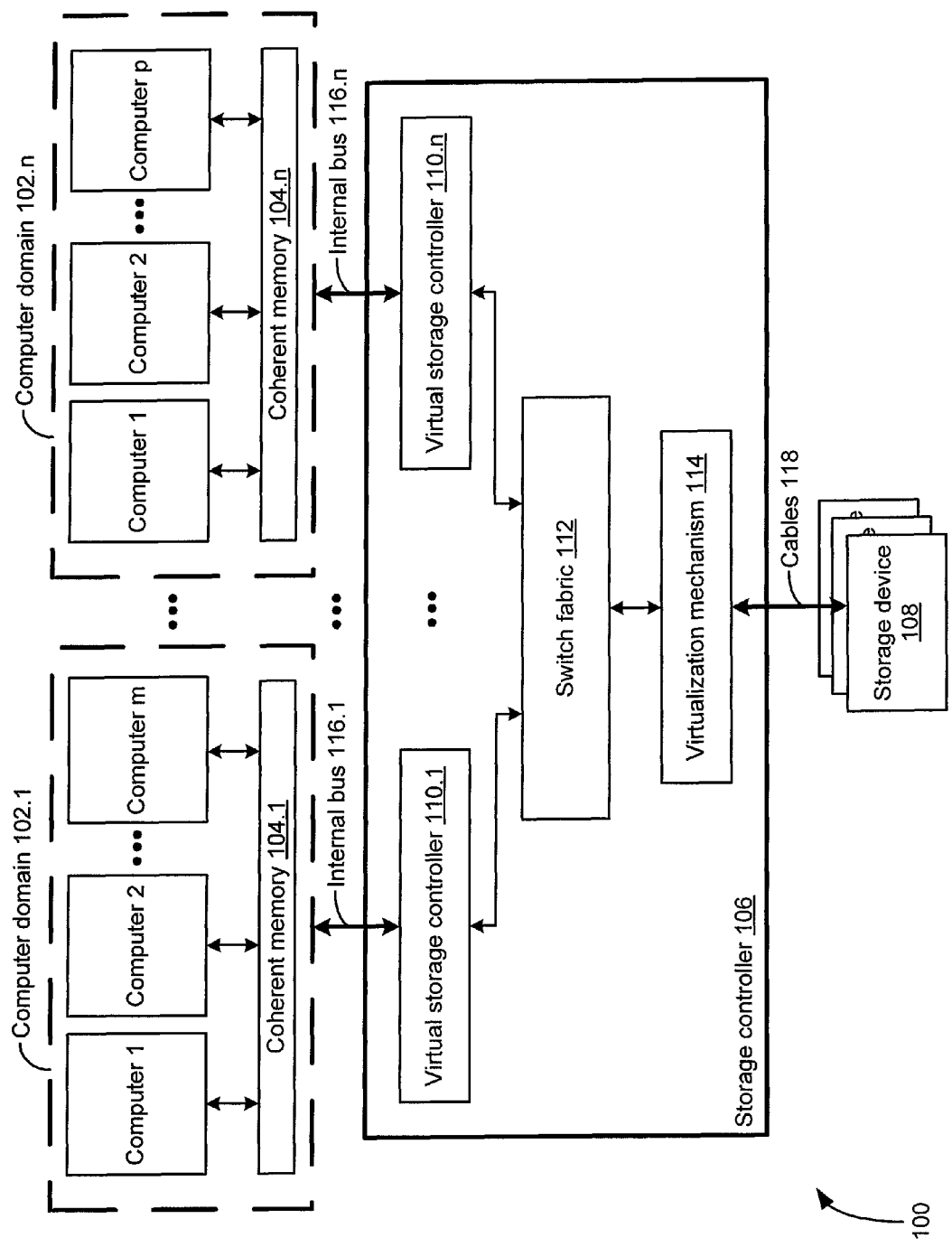
FIG. 1 is a block diagram of an exemplary storage controller system, in accordance with the present application.

In accordance with the present application, a serial advanced technology attachment (SATA)-compatible storage controller is disclosed that can be configured to allow computers assigned to multiple different computer domains connected by at least one switch fabric to share resources of a common set of storage devices. The disclosed storage controller includes a plurality of virtual storage controllers, each providing an interface to a respective computer domain connected to the switch fabric, a virtualization mechanism configured to implement link layer virtualization for the common set of storage devices, and a split protocol stack, the processing of which is partitioned between the respective virtual storage controllers and the virtualization mechanism.

Conventional computer systems that employ known resource sharing technologies to share data stored on a common set of disks among computers within multiple different computer domains have several drawbacks, including increased latency and increased computer overhead, resulting in increased hardware ownership and development costs. The disclosed storage controller allows groups of computers within multiple different computer domains to access a common set of storage devices concurrently at runtime to share data stored on the respective storage devices, particularly when the computer domains are physically close to one another, such as within a rack. Such sharing of data among the computers within the multiple different computer domains can be advantageously achieved with decreased latency, reduced central processing unit (CPU) overhead, fewer duplicated copies of host computer software and/or data, and decreased hardware ownership and development costs.

In one aspect, the disclosed storage controller includes the plurality of virtual storage controllers configured to provide interfaces to a plurality of computer domains, respectively, the virtualization mechanism configured to implement link layer virtualization for a common set of storage devices, a switch fabric configured to route control and data traffic between the respective virtual storage controllers and the virtualization mechanism, and the split SATA protocol stack, which includes an operating system (OS)/application layer, a command layer, a transport layer, a link layer, and a physical layer. In an exemplary aspect, each virtual storage controller is operative to perform protocol processing of the OS/application layer, the command layer, and the transport layer of the split SATA protocol stack, and the virtualization mechanism is operative to perform protocol processing of the link layer and the physical layer of the split SATA protocol stack.

In another aspect, the disclosed storage controller includes at least a first virtual storage controller and a second virtual storage controller configured to provide interfaces to at least a first computer domain and a second computer domain, respectively, a virtualization mechanism configured to implement link layer virtualization for at least one common storage device, a switch fabric configured to route control and data traffic between the first and second virtual storage controllers and the virtualization mechanism, and a split SATA protocol stack. The processing of the split SATA protocol stack is partitioned between the first and second virtual storage controllers (each of which can process OS/application, command, and transport layers of the split SATA protocol stack), and the virtualization mechanism (which can process link and physical layers of the split SATA protocol stack).

In an exemplary mode of operation, a command for writing data to the common storage device is received at the first virtual storage controller from a computer within the first computer domain, causing control/data traffic to be transferred from the OS/application and command layers through the transport layer of the split SATA protocol stack to the switch fabric, which provides the control/data traffic to the virtualization mechanism. Within the virtualization mechanism, the control/data traffic is transferred through the link layer and the physical layer of the split SATA protocol stack to the common storage device, which has a SATA protocol stack that includes a physical layer, a link layer, a transport layer, a command layer, and a device control layer. The control/data traffic is received at the physical layer interface of the common storage device from the physical layer interface of the virtualization mechanism, and is transferred up to the device control layer through the link layer, the transport layer, and the command layer of the protocol stack within the common storage device.

In a further exemplary mode of operation, in response to a command from a computer within the second computer domain for reading data from the common storage device, control/data traffic is transferred from the device control and command layers through the transport layer, the link layer, and the physical layer of the protocol stack within the common storage device, which transfers the control/data traffic to the physical layer interface of the virtualization mechanism. Within the virtualization mechanism, the control/data traffic is transferred to the switch fabric through the link layer of the split SATA protocol stack. The switch fabric provides the control/data traffic to the second virtual storage controller, which transfers the control/data traffic up to the computer within the second computer domain through the transport layer and the command and OS/application layers of the split SATA protocol stack.

In a further exemplary aspect, one or more command layer signals can be sent logically between the command layer of the split SATA protocol stack within the disclosed storage controller, and the command layer of the protocol stack within the common storage device. Likewise, one or more transport layer signals can be sent logically between the transport layer of the split SATA protocol stack within the disclosed storage controller, and the transport layer of the protocol stack within the common storage device. Moreover, one or more link layer signals can be sent logically between the link layer of the split SATA protocol stack within the disclosed storage controller, and the link layer of the protocol stack within the common storage device.

By providing a storage controller that includes at least two virtual storage controllers configured to provide interfaces to at least two different computer domains, respectively, a virtualization mechanism configured to implement link layer virtualization for a common set of storage devices, and a split SATA protocol stack whose processing is partitioned between the respective virtual storage controllers and the virtualization mechanism, groups of computers within the multiple different computer domains can successfully access the common set of storage devices concurrently at runtime to share data stored on the respective storage devices, or to share storage space while keeping each computer domain's data in separate partitions of the respective storage devices. Such sharing of data stored on the common set of storage devices among the groups of computers within the multiple different computer domains can be advantageously achieved with decreased latency and fewer duplicated copies of host computer software and/or data, resulting in reduced hardware ownership and development costs.

FIG. 1 depicts an illustrative embodiment of an exemplary storage controller system 100, in accordance with the present application. As shown in FIG. 1, the storage controller system 100 includes a storage controller 106 and at least one SATA device 108, such as a solid-state disk (SSD). The storage controller 106 includes a plurality of virtual storage controllers 110.1-110.$n$ configured to provide interfaces to groups of computers within a plurality of computer domains 102.1-102.$n$, respectively, a virtualization mechanism 114 configured to implement link layer virtualization for the common SATA device 108, and a switch fabric 112 configured to route control and data traffic between the respective virtual storage controllers 110.1-110.$n$ and the virtualization mechanism 114.

For example, the computer domain 102.1 may include a group of host computers 1-$m$ that share a common memory addressing space in coherent memory 104.1, and are connected to the virtual storage controller 110.1 via an internal bus 116.1. Likewise, the computer domain 102.$n$ may include a group of host computers 1-$p$ that share a common memory addressing space in coherent memory 104.$n$, and are connected to the virtual storage controller 110.$n$ via an internal bus 116.$n$. Further, the switch fabric 112 may be implemented as a cross-switch, a cross-point switch, a crossbar switch, a Peripheral Component Interconnect express (PCIe) switch, or any other suitable bidirectional, multipoint-to-multipoint switch. In addition, the virtualization mechanism 114 may be connected to the SATA device 108 by at least one cable 118 configured to conform to the *serial advanced technology attachment (SATA) International Organization: Serial ATA Revision 3.0, Jun. 2*, 2009, *Gold Revision* (also referred to herein as the "SATA specification"), or latest revision.

Figure 2:
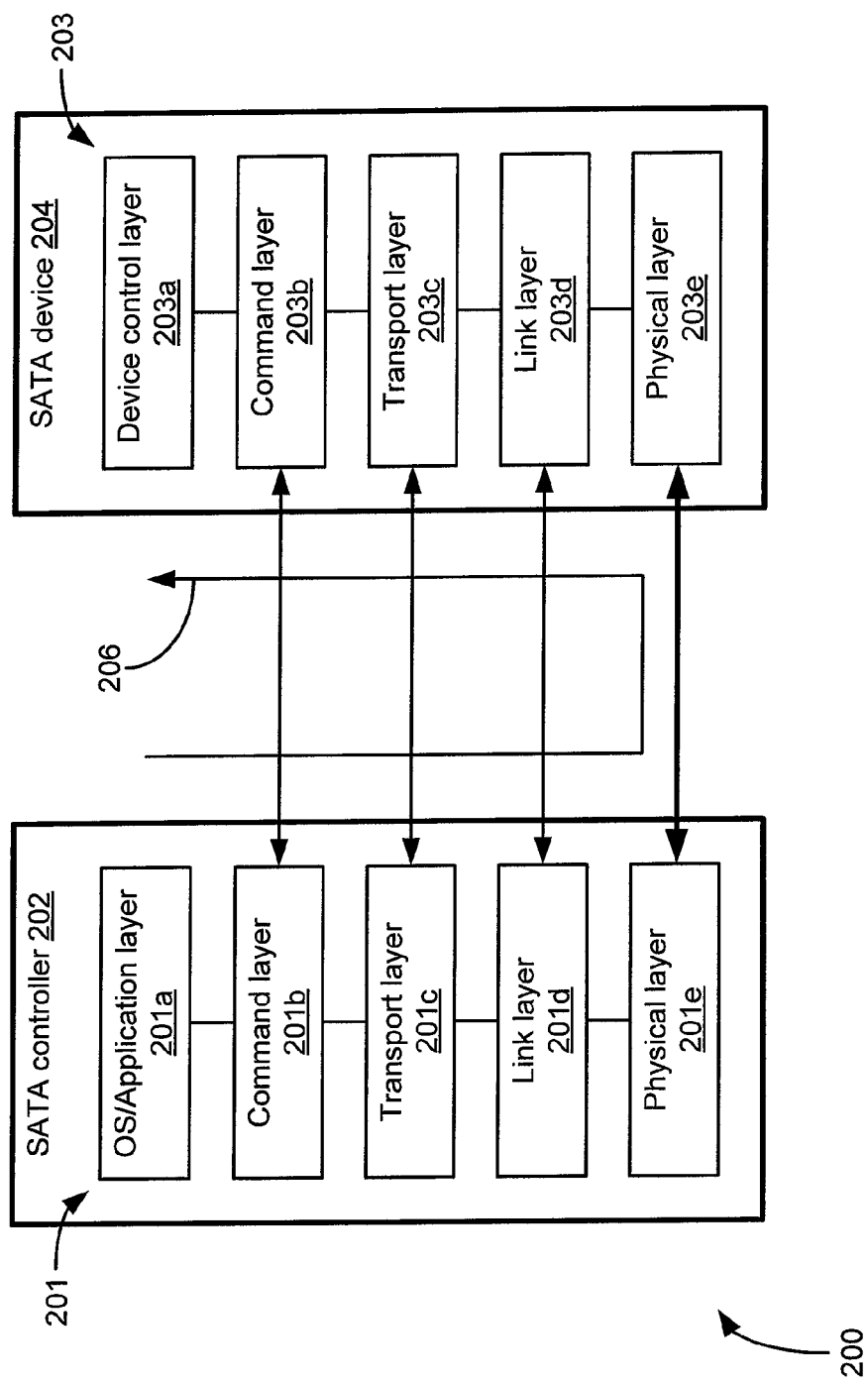
FIG. 2 is a block diagram of a SATA protocol stack included in a conventional SATA storage controller, and another SATA protocol stack included in a conventional SATA storage device.

FIG. 2 depicts an illustrative embodiment of a conventional SATA storage controller system 200, which includes a SATA storage controller 202 (also referred to herein as the "SATA controller") and a SATA device 204. As shown in FIG. 2, the SATA controller 202 employs the SATA protocol stack 201 that includes an operating system (OS)/application layer 201$a$, a command layer 201$b$, a transport layer 201$c$, a link layer 201$d$, and a physical layer 201$e$. The SATA device 204 also employs a SATA protocol stack 203 that includes a device control layer 203$a$, a command layer 203$b$, a transport layer 203$c$, a link layer 203$d$, and a physical layer 203$e$.

In response to a command from a host computer, such as a SATA command for writing data to the SATA device 204, control/data traffic is transferred from the OS/application and command layers 201$a$, 201$b$ to the SATA device 204 through the transport layer 201$c$, the link layer 201$d$, and the physical layer 201e of the SATA protocol stack 201 within the SATA controller 202. The physical layer 201e transfers the control/data traffic via a physical layer signal to the physical layer 203e of the SATA protocol stack 203 within the SATA device 204. The control/data traffic is further transferred from the physical layer 203e up to the device control and command layers 203a, 203b through the link layer 203d and the transport layer 203c of the SATA protocol stack 203. The transfer of control/data traffic from the OS/application and command layers 201a, 201b of the SATA protocol stack 201 to the device control and command layers 203a, 203b of the SATA protocol stack 203 is directionally indicated by an arrow 206. It is noted that, in response to another command from the host computer, such as a SATA command for reading data from the SATA device 204, control traffic can also be transferred through the protocol layers 201a-201e of the SATA protocol stack 201 within the SATA controller 202, and through the protocol layers 203a-203e of the SATA protocol stack 203 within the SATA device 204, in the direction indicated by the arrow 206. Further, data traffic can be transferred through the protocol layers 203a-203e of the SATA protocol stack 203 within the SATA device 204, and through the protocol layers 201a-201e of the SATA protocol stack 201 within the SATA controller 202, in a direction opposite from that indicated by the arrow 206.

Figure 3:
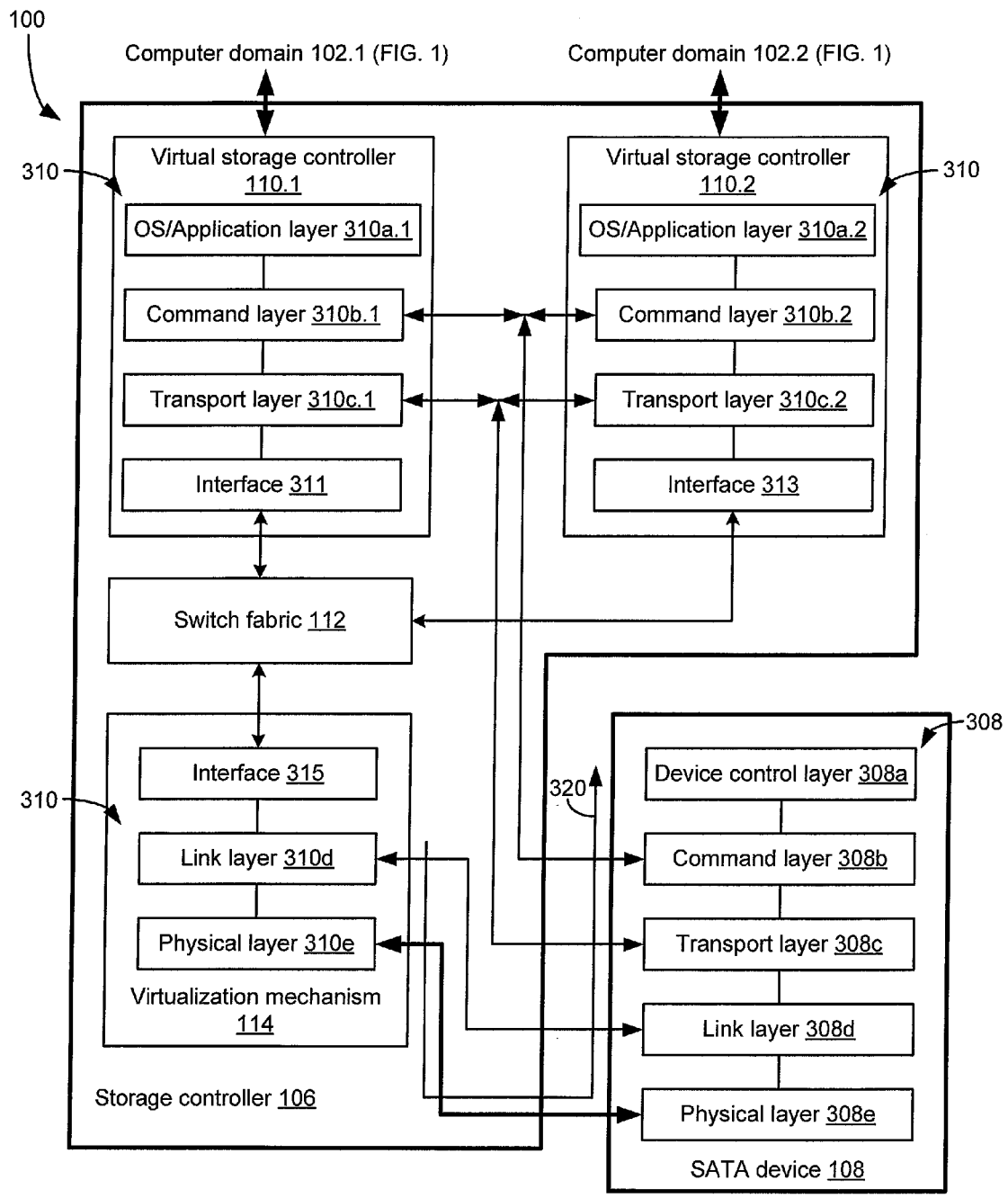
FIG. 3 is a block diagram of an exemplary storage controller and an exemplary SATA storage device included in the storage controller system of FIG. 1.

FIG. 3 depicts illustrative embodiments of the storage controller 106 and the SATA device 108 included in the storage controller system 100 (see also FIG. 1). As shown in FIG. 3, the storage controller 106 includes the virtual storage controllers 110.1, 110.2, the switch fabric 112, and the virtualization mechanism 114. It is noted that FIG. 3 depicts the two virtual storage controllers 110.1, 110.2 providing interfaces to the two computer domains 102.1, 102.2, respectively, for clarity of illustration, and that the storage controller 106 may alternatively include any other suitable number of virtual storage controllers providing interfaces to a corresponding number of computer domains, respectively.

Whereas the SATA controller 202 within the conventional SATA storage controller system 200 (see FIG. 2) employs the SATA protocol stack 201 that includes the OS/application layer 201a, the command layer 201b, the transport layer 201c, the link layer 201d, and the physical layer 201e, the storage controller 106 within the storage controller system 100 (see FIGS. 1 and 3) employs a split SATA protocol stack 310 whose processing is partitioned between the respective virtual storage controllers 110.1, 110.2 and the virtualization mechanism 114. As shown in FIG. 3, the split SATA protocol stack 310 can include an OS/application layer 310a.1, a command layer 310b.1, and a transport layer 310c.1, which are processed within the virtual storage controller 110.1, as well as a link layer 310d and a physical layer 310e, which are processed within the virtualization mechanism 114. Alternatively, the split SATA protocol stack 310 can include an OS/application layer 310a.2, a command layer 310b.2, and a transport layer 310c.2, which are processed within the virtual storage controller 110.2, as well as the link layer 310d and the physical layer 310e processed within the virtualization mechanism 114. The SATA device 108 also employs a protocol stack 308 that includes a device control layer 308a, a command layer 308b, a transport layer 308c, a link layer 308d, and a physical layer 308e.

It is noted that, using the split SATA protocol stack 310 within the storage controller 106 (see FIGS. 1 and 3), command layer signals can be sent logically between the command layers 310b.1, 310b.2 of the split SATA protocol stack 310 within the storage controller 106, and the command layer 308b of the protocol stack 308 within the SATA device 108. Likewise, transport layer signals can be sent logically between the transport layers 310c.1, 310c.2 of the split SATA protocol stack 310 within the storage controller 106, and the transport layer 308c of the protocol stack 308 within the SATA device 108. Moreover, link layer signals can be sent logically between the link layer 310d of the split SATA protocol stack 310 within the storage controller 106, and the link layer 308d of the protocol stack 308 within the SATA device 108.

In one mode of operation, a SATA command for writing data to the SATA device 108 can be received at the virtual storage controller 110.1 from a host computer within the computer domain 102.1, causing control/data traffic to be transferred from the OS/application and command layers 310a.1, 310b.1 through the transport layer 310c.1 of the split SATA protocol stack 310 to an interface 311 within the virtual storage controller 110.1. The interface 311 passes the control/data traffic to the switch fabric 112, which provides the control/data traffic to an interface 315 within the virtualization mechanism 114. The interface 315 passes the control/data traffic to the link layer 310d for subsequent transfer through the physical layer 310e of the split SATA protocol stack 310 to the SATA device 108. The control/data traffic is received at the physical layer 308e of the protocol stack 308 within the SATA device 108 from the physical layer 310e of the split SATA protocol stack 310 within the storage controller 106, and is transferred up to the device control and command layers 308a, 308b through the link layer 308d and the transport layer 308c of the protocol stack 308, as directionally indicated by an arrow 320.

In a further mode of operation, in response to a SATA command from a host computer within the computer domain 102.2 for reading data from the SATA device 108, control/data traffic can be transferred from the device control and command layers 308a, 308b through the transport layer 308c, the link layer 308d, and the physical layer 308e of the protocol stack 308 within the SATA device 108, which, in turn, transfers the control/data traffic to the physical layer 310e of the split SATA protocol stack 310 within the storage controller 106. The control/data traffic is then transferred from the physical layer 310e through the link layer 310d of the split SATA protocol stack 310 to the interface 315, which passes the control/data traffic to the switch fabric 112. The switch fabric 112 provides the control/data traffic to an interface 313 within the virtual storage controller 110.2, which passes the control/data traffic to the transport layer 310c.2 for subsequent transfer up to the host computer within the computer domain 102.2 through the command and OS/application layers 310b.2, 310a.2 of the split SATA protocol stack 310.

As noted above, the split SATA protocol stack 310 within the storage controller 106 (see FIGS. 1 and 3) may conform to the SATA specification. In accordance with the SATA specification, the OS/application and command layers are generally responsible for command execution, the transport layer is generally responsible for inserting data to be transferred between a host computer and the SATA device 108, as well as internal control information, into a packet/frame structure (known as a "frame information structure" or "FIS"), the link layer is generally responsible for extracting the data from the FIS, encoding/decoding each byte of data using, e.g., 8b/10b encoding/decoding techniques, and inserting the internal control information so that the resulting data stream can be decoded properly, and the physical layer is generally responsible for transmitting/receiving the encoded information as a serial data stream.

In the conventional SATA storage controller system 200 (see FIG. 2), during normal operation, each FIS is transferred between the transport layer 201c and the link layer 201d of the SATA protocol stack 201 within the SATA controller 202. Because the storage controller 106 included in the storage controller system 100 (see FIG. 1) employs the split SATA protocol stack 310, a FIS can be transferred from the transport layer 310c.1 to the link layer 310d through the interface 311 within the virtual storage controller 110.1, the switch fabric 112, and the interface 315 within the virtualization mechanism 114. Likewise, using the split SATA protocol stack 310, a FIS can be transferred from the transport layer 310c.2 to the link layer 310d through the interface 313 within the virtual storage controller 110.2, the switch fabric 112, and the interface 315 within the virtualization mechanism 114. In contrast to the SATA controller 202 within the conventional SATA storage controller system 200, the storage controller 106 within the storage controller system 100 is therefore operative to perform several additional steps in its handling of frame information structures.

For example, if a FIS is to be transferred from the transport layer 310c.1 (or the transport layer 310c.2) to the link layer 310d of the split SATA protocol stack 310 within the storage controller 106, then, in the event the FIS is at the beginning of a new independent sequence of frame information structures (typically, a "Register Host to Device" FIS), the interface 311 (or the interface 313) can send a request along with the FIS type through the switch fabric 112 to the interface 315 within the virtualization mechanism 114 to obtain access permission. If the request for access permission is denied by the interface 315, then the interface 311 (or the interface 313) can send another such request for access permission at a later time. Otherwise, if the request for access permission is granted by the interface 315, then the interface 311 (or the interface 313) can send the FIS along with a host computer identifier (also referred to herein as a "host ID") to the interface 315 through the switch fabric 112. In the event that FIS is not at the beginning of a new independent sequence of frame information structures, the interface 311 (or the interface 313) can send the FIS along with the host ID to the interface 315 through the switch fabric 112, without sending a request for access permission. It is noted that the virtualization mechanism 114 has full knowledge of the SATA protocol to guarantee that no unresolvable contention occurs between the interfaces 311, 313, by appropriately granting permissions at the proper times.

Upon receipt of the FIS at the interface 315 within the virtualization mechanism 114, the interface 315 can record information, as required, set its internal state, modify the FIS, as required, and pass the FIS to the physical layer 310e through the link layer 310d of the split SATA protocol stack 310 within the storage controller 106. The FIS can then be received at the physical layer 308e of the protocol stack 308 within the SATA device 108 from the physical layer 310e of the split SATA protocol stack 310, and transferred up to the device control and command layers 308a, 308b through the link layer 308d and the transport layer 308c of the protocol stack 308, as directionally indicated by the arrow 320.

If a FIS is to be transferred from the link layer 310d to the transport layer 310c.1 (or the transport layer 310c.2) of the split SATA protocol stack 310, then the interface 315 within the virtualization mechanism 114 can examine the FIS against its internal state and any recorded information, modify the FIS, as required, identify the virtual storage controller 110.1 or 110.2 to which that FIS is to be sent, replicate the FIS for subsequent receipt at multiple host computers, as required, and send the FIS to the identified virtual storage controller 110.1 or 110.2 via the switch fabric 112. The FIS can then be received at the interface 311 (or the interface 313) within the virtual storage controller 110.1 (or the virtual storage controller 110.2) from the switch fabric 112, and transferred up to the OS/application and command layers 310a.1, 310b.1 (or the OS/application and command layers 310a.2, 310b.2) through the transport layer 310c.1 (or the transport layer 310c.2) of the split SATA protocol stack 310. The interface 311 (or the interface 313) is further operative to convert FIS packaging formats, as required, between the transport layer 310c.1 (or the transport layer 310c.2) of the split SATA protocol stack 310 and the switch fabric 112. Likewise, the interface 315 within the virtualization mechanism 114 is further operative to convert FIS packaging formats, as required, between the switch fabric 112 and the link layer 310d of the split SATA protocol stack 310. Because the transport layer 310c.1, the transport layer 310c.2, and the link layer 310d each conform to the SATA specification, no significant modifications to these respective layers are required.

It is noted that a number of FIS structures conforming to the SATA specification can be defined to further illustrate the internal operation of the disclosed SATA-compatible storage controller. For example, a command FIS (also referred to herein as a "C-FIS") can be defined as a FIS that is issued by a host computer to the SATA device 108 to perform a particular task. Such a C-FIS can have a Host-to-Device FIS Type (27h) with the "C" bit set to 1. A non-command FIS (also referred to herein as an "NC-FIS") can be defined as a FIS that is not a C-FIS. In addition, a native queued command FIS (also referred to herein as an "NQC-FIS") can be defined as a C-FIS whose command is READ First-Party Direct Memory Access (FPDMA) QUEUED (60h), WRITE FPDMA QUEUED (61h), READ DIRECT MEMORY ACCESS (DMA) QUEUED (C7h), WRITE DMA QUEUED (CCh), READ DMA QUEUED EXTENDED (EXT) (26h), or WRITE DMA QUEUED EXT (36h). A non-native queued command FIS (also referred to herein as an "NNQC-FIS") can be defined as a C-FIS that is not an NQC-FIS.

Moreover, an uninterruptable transaction (also referred to herein as a "UIT") can be defined as a sequence of frame information structures transferrable between the storage controller 106 (see FIGS. 1 and 3) and the SATA device 108 (see FIGS. 1 and 3). During such a UIT, a host computer and the SATA device 108 are not permitted to send any frame information structure(s) that are not related to a particular task associated with the UIT. One example of such a UIT has an NNQC-FIS at the beginning of the sequence to commence execution of a command issued by the host computer, and an NC-FIS at the end of the sequence to notify the host computer of completion of the UIT, and to report the status of the completion.

In addition, a number of different UIT types can be defined, including an NNQC-UIT, an NQC-Command (CMD)-UIT, and an NQC-Data (DATA)-UIT. The NNQC-UIT can include an NNQC-FIS followed by a sequence of corresponding non-command (NC) frame information structures for performing a particular task. The NQC-CMD-UIT can include an NQC-FIS followed by a sequence of corresponding NC frame information structures for queuing commands (e.g., up to 32 commands) from at least one host computer to the SATA device 108. The NQC-DATA-UIT can include a DMA setup FIS (41h) command issued by the SATA device 108 followed by a sequence of corresponding NC frame information structures for moving data corresponding to a previous NQC-FIS.

Figure 4:
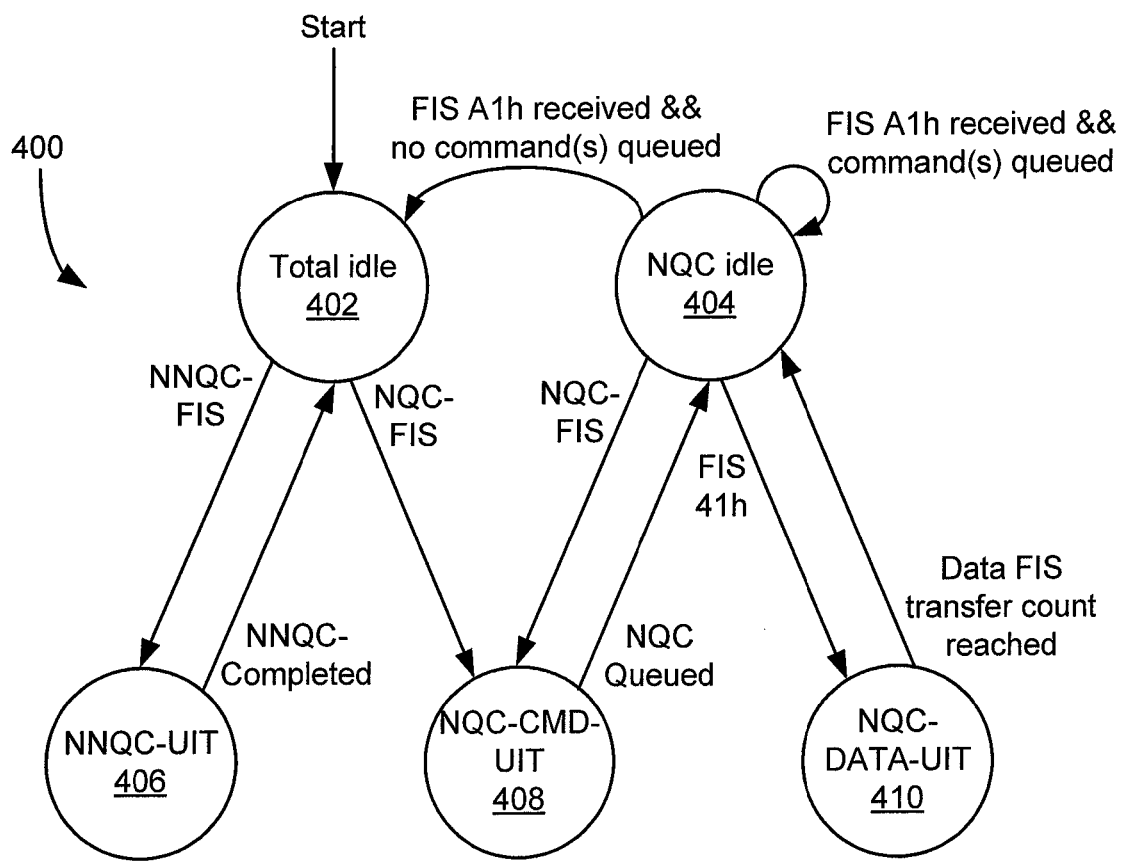
FIG. 4 is a state diagram illustrating operative states of an exemplary virtualization mechanism included in the storage controller of FIG. 3.

The uninterruptible transactions defined above can, in turn, be used to define a plurality of operative states of the interface 315 included in the virtualization mechanism 114. FIG. 4 depicts a state diagram illustrating exemplary operative states 400 of the interface 315, including a total idle state 402, an NQC idle state 404, an NNQC-UIT state 406, an NQC-CMD-UIT state 408, and an NQC-DATA-UIT state 410. As shown in FIG. 4, the interface 315 can enter (from "Start") the total idle state 402, e.g., when a UIT is not currently being performed, and a command is not currently queued for execution. In the event the interface 315 receives an NNQC-FIS when in the total idle state 402, the interface 315 can transition from the total idle state 402 to the NNQC-UIT state 406, during which an NNQC-UIT is performed. When that NNQC-UIT is completed, the interface 315 can transition from the NNQC-UIT state 406 back to the total idle state 402. In the event the interface 315 receives an NQC-FIS when in the total idle state 402, the interface 315 can transition from the total idle state 402 to the NQC-CMD-UIT state 408, during which an NQC-CMD-UIT is performed. When that NQC is queued, the interface 315 can transition from the NQC-CMD-UIT state 408 to the NQC idle state 404.

When the interface 315 is in the NQC idle state 404, a UIT is not currently being performed, and at least one command is queued whose execution is not completed. In the event the interface 315 receives an NQC-FIS when in the NQC idle state 404, the interface 315 can transition from the NQC idle state 404 back to the NQC-CMD-UIT state 408. In the event the interface 315 receives a FIS of Set Device Bits (i.e., A1h)) when in the NQC idle state 404 and a command is not queued for execution, the interface 315 can transition from the NQC idle state 404 back to the total idle state 402. Alternatively, in the event the interface 315 receives a FIS of Set Device Bits (i.e., A1h)) when in the NQC idle state 404 and at least one command is queued for execution, the interface 315 can remain in the NQC idle state 404. In the event the interface 315 receives a DMA setup FIS (41h) command when in the NQC idle state 404, the interface 315 can transition from the NQC idle state 404 to the NQC-DATA-UIT state 410, during which an NQC-DATA-UIT is performed. In the event a specified data FIS transfer count is reached when the interface 315 is in the NQC-DATA-UIT state 410, the interface 315 can transition from the NQC-DATA-UIT state 410 back to the NQC idle state 404.

As described above, if a FIS is to be transferred from the transport layer 310c.1 (or the transport layer 310c.2) to the link layer 310d of the split SATA protocol stack 310 within the storage controller 106 (see FIG. 3), then, in the event the FIS is at the beginning of a new independent sequence of frame information structures, the interface 311 (or the interface 313) can send a request along with the FIS type through the switch fabric 112 to the interface 315 within the virtualization mechanism 114 to obtain access permission. With reference to the state diagram of FIG. 4, the interface 315 can grant such access permission to the interface 311 (or the interface 313), as follows:

```
if (state == "the total idle state 402") grant = "Yes";
else if (state == "the NQC idle state 404"
        && request == "NQC-FIS"
        && at least one command slot of command queue is unoccupied)
    grant = "Yes";
else grant = "No";
```

It is noted that a race condition can occur when the interface 315 within the virtualization mechanism 114 is in the NQC idle state 404 (see FIG. 4), the interface 315 has just granted access permission to the interface 311 (or the interface 313) to queue a command for accessing the SATA device 108, the interface 311 (or the interface 313) is about to but has not yet queued the command, thereby starting a new NQC-CMD-UIT, and, in the meantime, the SATA device 108 issues a DMA setup FIS (41h) command, thereby starting a new NQC-DATA-UIT. However, the NQC idle state 404 cannot transfer to NQC-CMD-UIT 408 and to NQC-DATA-UIT 410 at the same time. This condition constitutes what is referred to herein as an "NQC-collision condition". In accordance with the SATA specification, the NQC-DATA-UIT 410 shall take precedence. The interface 311 (or the interface 313) would now be prohibited from queuing the desired command to access the SATA device 108 while the NQC-DATA-UIT is in progress. Such an NQC-collision condition will be further discussed below with reference to FIGS. 5a and 5b.

Figure 5A:
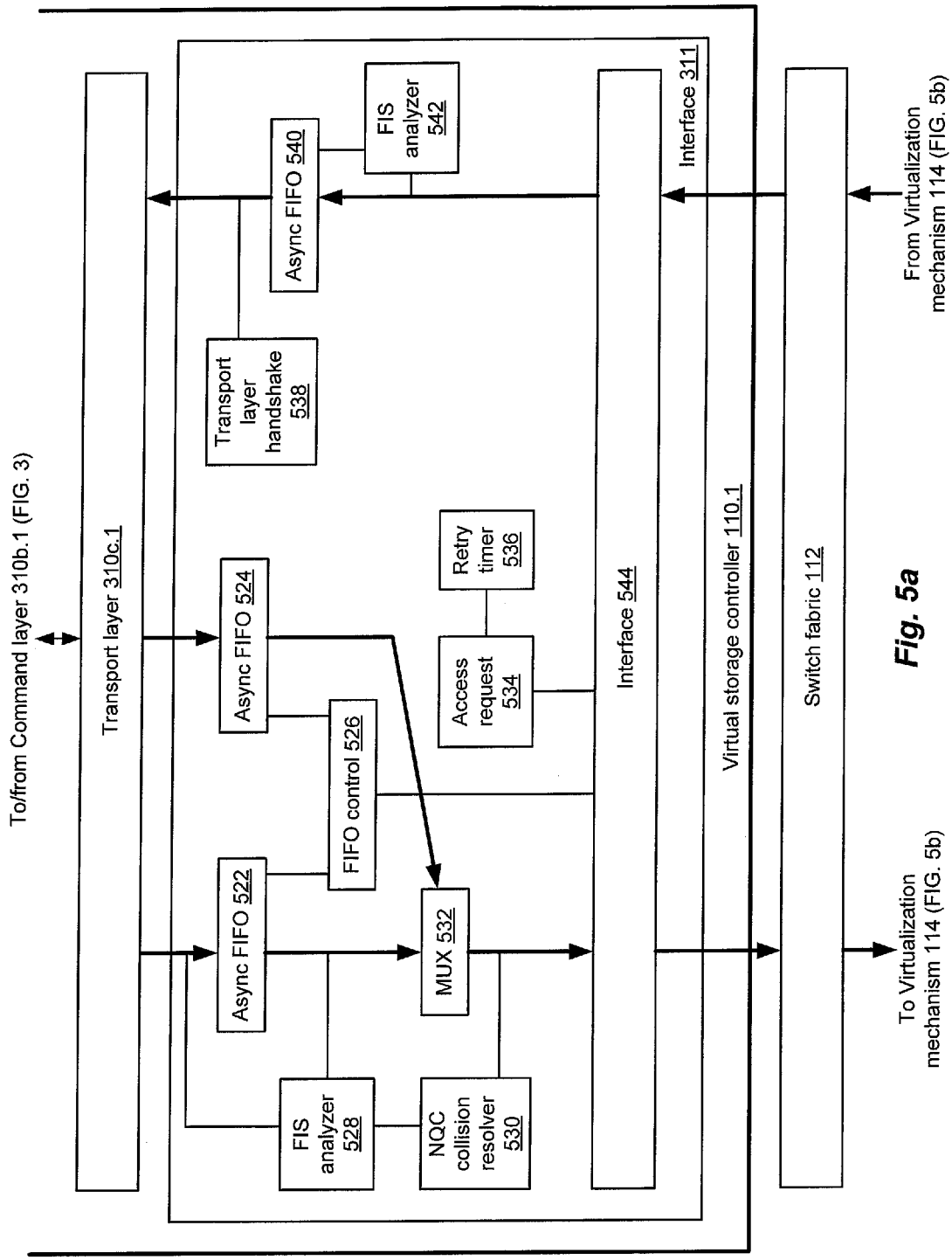
FIG. 5a is a block diagram of an exemplary implementation within an exemplary virtual storage controller included in the storage controller of FIG. 3.

FIG. 5a depicts an exemplary implementation of the interface 311 within the virtual storage controller 110.1. It is noted that the interface 313 within the virtual storage controller 110.2 can be implemented like the interface 311 within the virtual storage controller 110.1. As shown in FIG. 5a, the interface 311 includes an asynchronous first-in-first-out (FIFO) buffer 522, an asynchronous FIFO buffer 524, a multiplexer (MUX) 532, a FIFO control block 526, a FIS analyzer 528, an NQC collision resolver 530, an asynchronous FIFO buffer 540, a transport layer handshake block 538, a FIS analyzer 542, an access request block 534, a retry timer 536, and an interface 544 to the switch fabric 112. The asynchronous FIFO buffer 522 is operative to store internal control signals from the transport layer 310c.1, and the asynchronous FIFO buffer 524 is operative to store frame information structures (data) from the transport layer 310c.1. Because the switch fabric 112 may be in a clock domain that is different from the clock domain of the transport layer 310c.1, the FIFO buffers 522, 524 are configured to be asynchronous. The FIFO control block 526 is operative to control the FIFO buffers 522, 524 for subsequently accessing the switch fabric 112, and the MUX 532 is operative to multiplex the control and data traffic provided by the FIFO buffers 522, 524, respectively.

The FIS analyzer 528 is operative to analyze one or more frame information structures being transferred from a host computer within the computer domain 102.1 to the SATA device 108, and to generate appropriate internal control signals. The NQC collision resolver 530 is operative to handle a potential NQC collision condition. For example, in the event the NQC collision resolver 530 determines that the transport layer 310c.1 has submitted an NQC-FIS that has not yet been queued and subsequently determines that the SATA device 108 has issued a DMA setup FIS (41h) command, the NQC collision resolver 530 can direct the transport layer 310c.1 to buffer the NQC-FIS and resubmit it at a later time to avoid a conflict with a new NQC-DATA-UIT. The access request block 534 is operative to request access permission from the interface 315 (see FIG. 5b) to queue one or more requests (commands) for accessing the SATA device 108. In the event the requested access permission is denied by the interface 315, the retry timer 536 can signal the access request block 534 to send another request for access permission after a specified or randomized time period.

The asynchronous FIFO buffer 540 is operative to store one or more frame information structures transferred from the SATA device 108. Because the switch fabric 112 may be in a clock domain that is different from the clock domain of the transport layer 310c.1, the FIFO buffer 540 is also configured to be asynchronous. The transport layer handshake block 538 is operative to generate handshaking signals for use in efficiently transferring frame information structures to the transport layer 310c.1. For example, such handshaking signals generated by the transport layer handshake block 538 can facilitate the pipelining of frame information structures from the interface 311 to the transport layer 310c.1. The FIS analyzer 542 is operative to analyze one or more frame information structures being transferred from the SATA device 108 to a host computer within the computer domain 102.1, and to generate appropriate internal control signals.

Figure 5B:
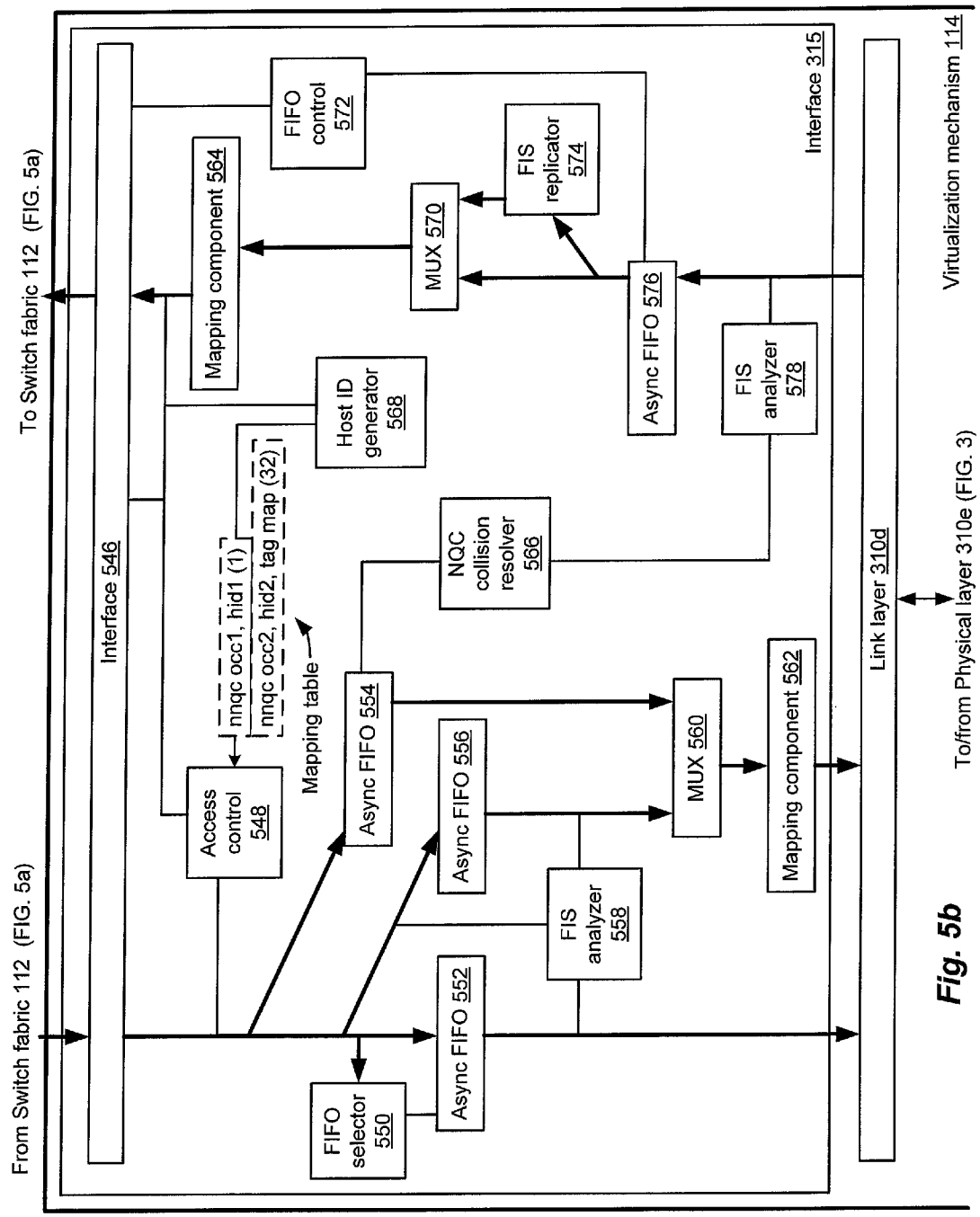
FIG. 5b is a block diagram of an exemplary implementation within the virtualization mechanism included in the storage controller of FIG. 3.

FIG. 5b depicts an exemplary implementation of the interface 315 within the virtualization mechanism 114. As shown in FIG. 5b, the interface 311 includes an asynchronous FIFO buffer 552, an asynchronous FIFO buffer 554, an asynchronous FIFO buffer 556, an access control block 548, a FIFO selector 550, a FIS analyzer 558, a MUX 560, a mapping component 562, an asynchronous FIFO buffer 576, a FIFO control block 572, a FIS analyzer 578, an NQC collision resolver 566, a FIS replicator 574, a MUX 570, a host ID generator 568, a mapping component 564, and an interface 546 to the switch fabric 112. The asynchronous FIFO buffer 552 is operative to store the internal control signals from the interface 311 (see FIG. 5a). Because the switch fabric 112 may be in a clock domain that is different from the clock domain of the link layer 310d, the FIFO buffers 552, 554, 556, 576 are configured to be asynchronous. The asynchronous FIFO buffer 556 is operative to store one or more frame information structures (data) from the interface 311 (see FIG. 5a). The FIFO selector 550 is operative to select, one at a time, the asynchronous FIFO buffer 552 or 556 to be active. The asynchronous FIFO buffer 554 is operative to store one or more NQC frame information structures to be sent to the SATA device 108.

The FIS analyzer 558 is operative to analyze one or more frame information structures being transferred from a host computer within the computer domain 102.1 to the SATA device 108, and to generate appropriate internal control signals. The MUX 560 is operative to multiplex control/data traffic provided by the respective FIFO buffers 554, 556. Likewise, the MUX 570 is operative to multiplex control/data traffic provided by the FIFO buffer 576 and the FIS replicator 574. The NQC collision resolver 566 is operative to handle a potential NQC collision condition. For example, in the event the NQC collision resolver 566 determines that frame information structures involved in a potential NQC collision condition are associated with the same virtual storage controller 110.1 or 110.2, the NQC collision resolver 566 can direct the interface 311 (or the interface 313) to backup or cancel its NQC-FIS while a new NQC-DATA-UIT is in progress. Further, in the event the NQC collision resolver 566 determines that frame information structures involved in a potential NQC collision condition are associated with the different virtual storage controllers 110.1, 110.2, the NQC collision resolver 566 can temporarily store the NQC-FIS within the interface 315 and resubmit it to the link layer 310d at a later time on behalf of the interface 311 (or the interface 313). In this case, the interface 311 (or the interface 313) is not aware that a collision with a different virtual storage controller ever happened.

The access control block 548 is operative to decide whether or not to grant access permission to a request from the interface 311 (or the interface 313). In one embodiment, local memory within the storage controller 106 can be used to store, e.g., in a mapping table, relevant information upon which such access decisions can be based. For example, the mapping table can be configured to store one (1) entry of an NNQC-FIS to indicate whether or not the interface 315 within the virtualization mechanism 114 is in the NNQC-UIT state (as indicated by "occ1"; see FIG. 5b), and to indicate the host ID of a host computer associated with that NNQC-UIT (as indicated by "hid1"; see FIG. 5b). Further, the mapping table can be configured to store a number (e.g., 32) of entries "m" of an NQC-FIS to indicate whether or not a corresponding command slot m of a command queue associated with the SATA device 108 is occupied (as indicated by "occ2"; see FIG. 5b), to indicate the host ID of a host computer associated with that command slot m of the SATA device 108 (as indicated by "hid2"; see FIG. 5b), and to indicate a corresponding command slot "n" of a command queue associated with the virtual storage controller 110.1 or 110.2 (as indicated by "tag map"; see FIG. 5b). The mapping components 562, 564 are operative to map and/or swap between the command slot(s) m of the SATA device 108 and command slot(s) n of the virtual storage controllers 110.1, 110.2, thereby virtualizing one or more command queues that can be accessed by the SATA device 108 and/or the respective virtual storage controllers 110.1, 110.2.

Figure 6:
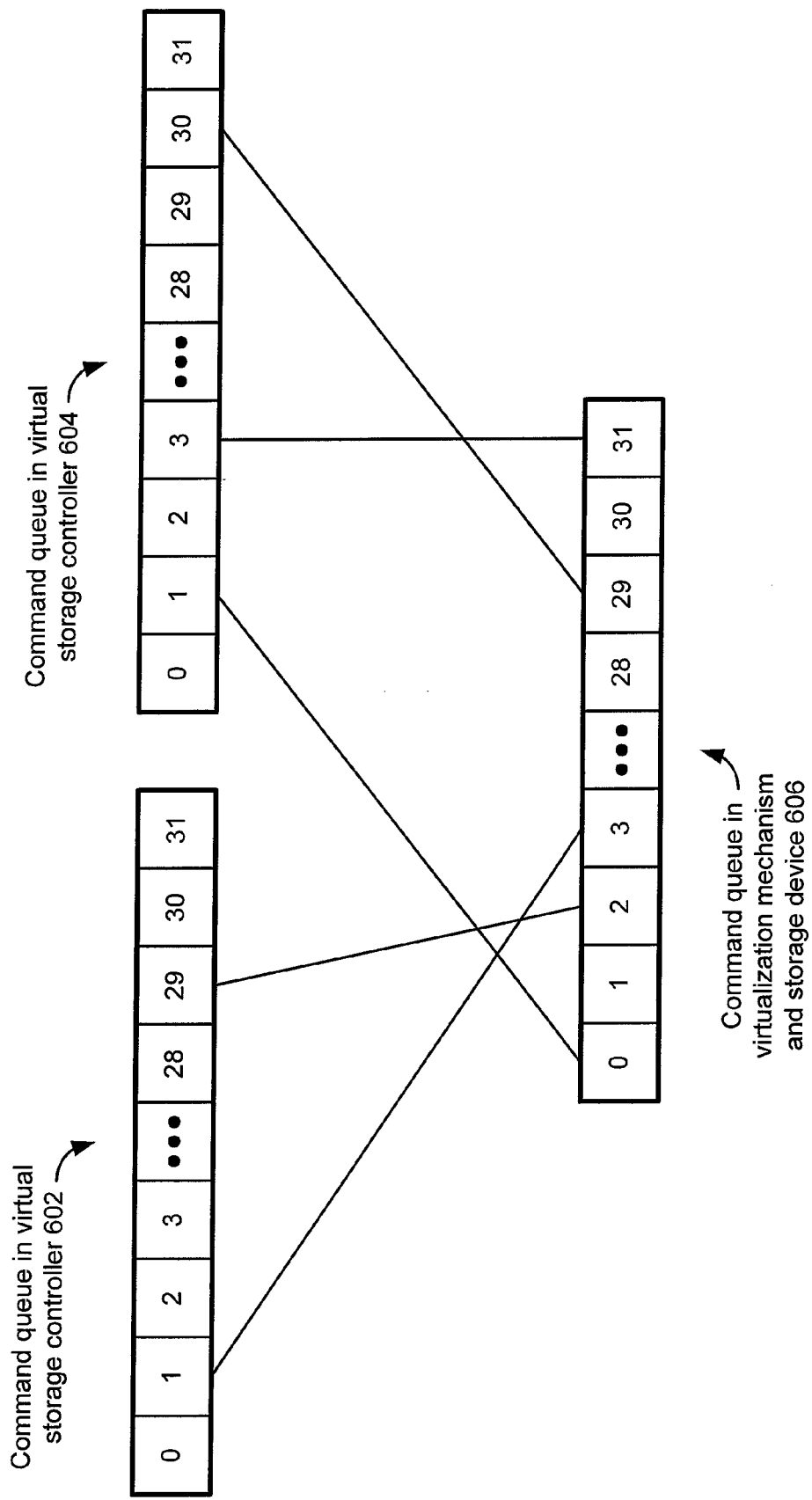
FIG. 6 is a diagram illustrating an exemplary mapping of command slots from a plurality of command queues to command slots within a virtual command queue associated with the storage device of FIG. 3.

FIG. 6 depicts an exemplary command queue 602 associated with the virtual storage controller 110.1, an exemplary command queue 604 associated with the virtual storage controller 110.2, and an exemplary virtual command queue 606 associated with the SATA device 108. It is noted that FIG. 6 depicts the two command queues 602, 604 associated with the two virtual storage controllers 110.1, 110.2 respectively, for clarity of illustration, and that any other suitable number of command queues associated with a corresponding number of virtual storage controllers, respectively, may be employed. Each of the command queues 602 and 604 can include thirty-two command slots n (n=32), in accordance with the SATA specification. Likewise, the virtual command queue 606 can include thirty-two command slots m (m=32), in accordance with SATA specification.

As described above, the mapping components 562, 564 are operative to map and/or swap between the command slot(s) m of the SATA device 108 and command slot(s) n of the virtual storage controllers 110.1, 110.2 to virtualize a command queue that can be accessed by the SATA device 108 and/or the respective virtual storage controllers 110.1, 110.2. FIG. 6 depicts an exemplary mapping between the 32 command slots n of the command queue 602 and the 32 command slots m of the virtual command queue 606, as well as an exemplary mapping between the 32 command slots n of the command queue 604 and the 32 command slots m of the virtual command queue 606. For example, the command slots 1 and 29 of the command queue 602 can correspond to two active occupied command slots, and the command slots 1, 3, and 30 of the command queue 604 can correspond to three active occupied command slots. Likewise, the command slots 0, 3, 29, and 31 of the virtual command queue 606 can correspond to four active occupied command slots. The remaining command slots 0, 2, 3, . . . , 28, 30, 31 of the command queue 602, and the remaining command slots 0, 2, 4, . . . , 28, 29, 31 of the command queue 604, can corresponding to idle unoccupied command slots, or occupied command slots but still waiting for grants to access the virtualization mechanism. The remaining command slots 1, 4, . . . , 28, 30 of the virtual command queue 606 can correspond to idle unoccupied command slots.

In accordance with the exemplary mapping illustrated in FIG. 6, the mapping component 562 can map the active occupied command slots 1 and 29 of the command queue 602 to the available command slots 3 and 2, respectively, of the virtual command queue 606. Likewise, the mapping component 562 can map the active occupied command slots 1, 3, and 30 of the command queue 604 to the available command slots 0, 31, and 29, respectively, of the virtual command queue 606. For example, the mapping component 562 can make such mappings of the active occupied command slots of the respective command queues 602, 604 to the available command slots of the virtual command queue 606 in a round robin manner, or in any other suitable manner. Moreover, the mapping component 564 can map the active occupied command slots 2, 3 of the virtual command queue 606 to the available command slots 29, 1, respectively, of the command queue 602. Likewise, the mapping component 564 can map the active occupied command slots 0, 29, 31 of the virtual command queue 606 to the available command slots 1, 30, 3, respectively, of the command queue 604. For example, the mapping component 564 can make such mappings of the active occupied command slots of the virtual command queue 606 to the available command slots of the respective command queues 602, 604 in a round robin manner, or in any other suitable manner.

The asynchronous FIFO buffer 576 is operative to store frame information structures transferred from the SATA device 108, and the FIFO control block 572 is operative to control the asynchronous FIFO buffer 576 for accessing the switch fabric 112. The host ID generator 568 is operative to assign, based on the current state of the interface 315 and the information stored in the mapping table, a host ID to each FIS (data) or control signal packet being transferred from the interface 315 to the interface 311 (or the interface 313) via the switch fabric 112. The switch fabric 112 can use the host ID information generated by the host ID generator 568 to route the data/control packet to the correct interface 311 or 313.

As described above, the split SATA protocol stack 310 within the storage controller 106 (see FIG. 3) may conform to the SATA specification, or any other suitable data link interface specification. To maintain conformance with the SATA specification, the storage controller 106 may be required to replicate certain frame information structures received from the SATA device 108, and to send the replicated frame information structures to multiple virtual storage controllers, such as the virtual storage controllers 110.1, 110.2. The FIS replicator 574 within the interface 315 is operative to perform such FIS replication. For example, the FIS replicator 574 may be operative to replicate the initial Register-Device to Host FIS (34h) issued by the SATA device 108. Because the Register-Device to Host FIS (34h) is not solicited by any host computer, the FIS replicator 574 can replicate the FIS so that it can be broadcast to the multiple virtual storage controllers 110.1, 110.2.

Further, the FIS replicator 574 may be operative to replicate a Set Device Bits-Device to Host FIS (A1h) issued by the SATA device 108, in the event the command has completion bits that are mapped to both virtual storage controllers 110.1, 110.2. For example, with reference to FIG. 6, if the SATA device 108 issues a Set Device Bits-Device to Host FIS (A1h), and the command is stored in the virtual command queue 606 with the completion bits in the command slots 0, 2 set to 1, then the FIS replicator 574 can generate two copies of the command. One copy of the command can be sent to the virtual storage controller 110.1 with the bit in the command slot 29 of the command queue 602 set to 1, and the other copy can be sent to the virtual storage controller 110.2 with the bit in the command slot 1 of the command queue 604 set to 1. It is noted that the FIS replicator 574 can perform any other suitable command, control, and/or data replications to assure conformance with the desired data link interface specification, such as the SATA specification.

Figure 7:
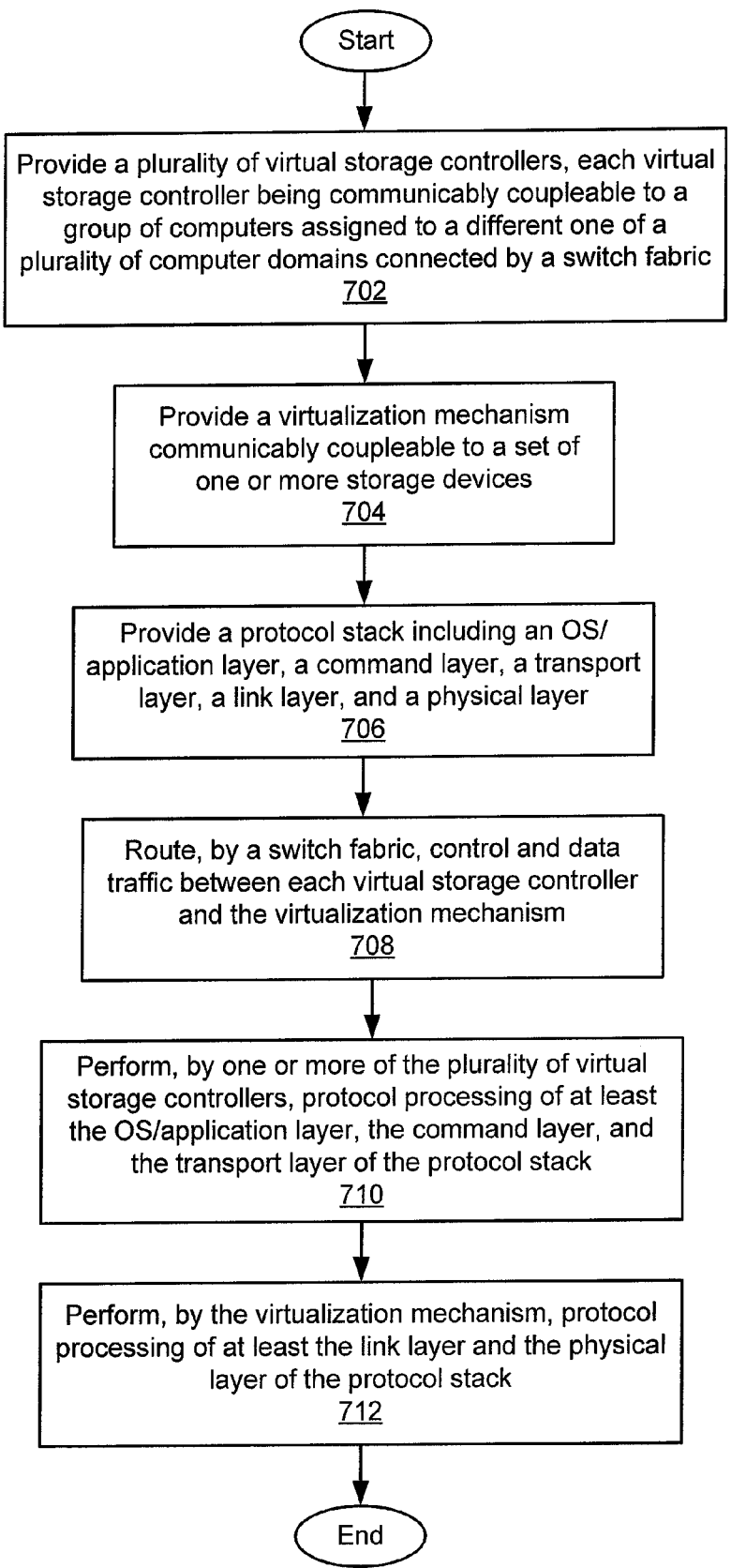
FIG. 7 is a flow diagram illustrating an exemplary method of operating the storage controller of FIG. 3.

A method of operating the disclosed storage controller is described below with reference to FIG. 7. The method of FIG. 7 can be used to allow computers assigned to multiple different computer domains connected by at least one switch fabric to share resources of a common set of storage devices. As depicted in block 702, a plurality of virtual storage controllers is provided, in which each virtual storage controller is communicably coupleable to a group of one or more computers assigned to a different one of a plurality of computer domains connected by at least one switch fabric. As depicted in block 704, a virtualization mechanism is provided, the virtualization mechanism being communicably coupleable to a set of one or more storage devices. As depicted in block 706, a protocol stack is provided, including an OS/application layer, a command layer, a transport layer, a link layer, and a physical layer. As depicted in block 708, a switch fabric routes control and data traffic between each virtual storage controller and the virtualization mechanism. In the method of FIG. 7, the processing of the protocol stack is partitioned between the respective virtual storage controllers and the virtualization mechanism. As depicted in block 710, one or more of the plurality of virtual storage controllers perform protocol processing of at least the OS/application layer, the command layer, and the transport layer of the protocol stack. As depicted in block 712, the virtualization mechanism performs protocol processing of at least the link layer and the physical layer of the protocol stack.

The foregoing description of exemplary embodiments is provided for purposes of illustration, and is not intended to be exhaustive or to limit the application to the precise form disclosed. Modifications and variations are possible in light of the teachings herein, or may be acquired from practice of the claimed invention. For example, while a series of operations has been described herein with reference to FIG. 7, the order of the operations may be modified in other implementations. Further, non-dependent operations may be performed in parallel.

It will be apparent that one or more embodiments described herein may be implemented in many different forms of software and/or hardware. Software code and/or specialized hardware used to implement embodiments described herein is not limiting of the claimed invention. Thus, the operation and behavior of embodiments were described herein without reference to the specific software code and/or the specialized hardware, it being understood that one of ordinary skill in the art would be able to design software and/or hardware to implement the embodiments based on the description herein.

Figure 8:
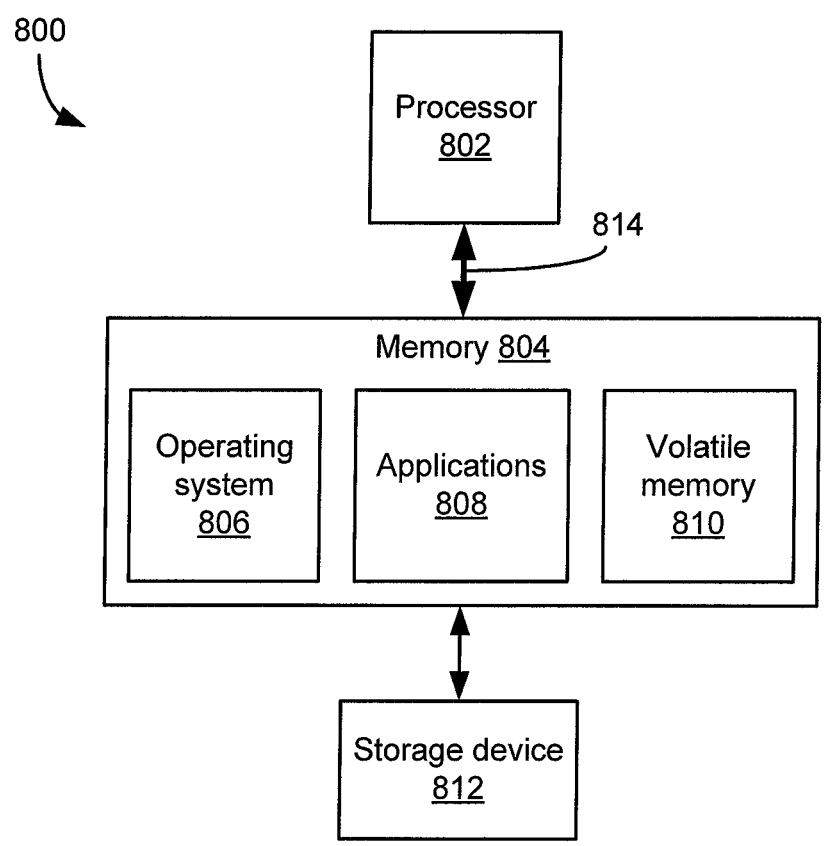
FIG. 8 is a block diagram of an exemplary computer system that can be configured to implement methods of operating the storage controller of FIG. 3.

Further, certain features of the claimed invention may be implemented using computer-executable instructions that may be executed by a processor or processing logic. FIG. 8 depicts an exemplary computer system 800 that can be configured to implement systems and methods of the claimed invention. As shown in FIG. 8, the computer system 800 can include at least one processor 802 communicably coupled to at least one memory 804 by a system bus 814, and at least one storage device 812 such as an SSD. The processor 802 is operative to execute instructions stored on at least one non-transitory storage medium, such as the memory 804 or any other suitable storage medium, for performing various processes within the computer system 800, including one or more processes for controlling operations of the memory 804 and/or the storage device 812. The memory 804 can include one or more memory components such as a volatile memory 810, which may be implemented as a dynamic random access memory (DRAM), or any other suitable volatile memory. The memory 804 can also be configured to store an operating system 806 executable by the processor 802, and one or more applications 808 that may be run by the operating system 806. In response to a request generated by one of the applications 808, the processor 802 can execute the operating system 806 to perform data write/read operations on the volatile memory 810 and/or the storage device 812.

It is noted that FIG. 8 illustrates an exemplary embodiment of the computer system 800, and that other embodiments of the computer system 800 may include more apparatus components, or fewer apparatus components, than the apparatus components illustrated in FIG. 8. Further, the apparatus components may be arranged differently than as illustrated in FIG. 8. For example, in some embodiments, the storage device 812 may be located at a remote site accessible to the computer system 800 via the Internet, or any other suitable network. In addition, functions performed by various apparatus components contained in other embodiments of the computer system 800 may be distributed among the respective components differently than as described herein.

No element, operation, or instruction employed herein should be construed as critical or essential to the application unless explicitly described as such. Also, as employed herein, the article "a" is intended to include one or more items. Where only one item is intended, the term "one" or similar language is employed. Further, the phrase "based on" is intended to mean "based, at least in part, on" unless explicitly stated otherwise.

It is intended that the invention not be limited to the particular embodiments disclosed herein, but that the invention will include any and all particular embodiments and equivalents falling within the scope of the following appended claims.

What is claimed is:

1. A SATA-compatible storage controller for use in allowing computers assigned to multiple different computer domains connected by at least one switch fabric to share resources of a common set of storage devices, comprising:
   a plurality of virtual storage controllers, each virtual storage controller being communicably coupleable to a group of one or more computers assigned to a different one of a plurality of computer domains;
   a virtualization mechanism communicably coupleable to a set of one or more storage devices;
   a switch fabric operative to route control and data traffic between each virtual storage controller and the virtualization mechanism; and
   a first protocol stack, processing of the first protocol stack being partitioned between the respective virtual storage controllers and the virtualization mechanism,
   wherein the first protocol stack includes an operating system (OS)/application layer, a first command layer, a first transport layer, a first link layer, and a first physical layer,
   wherein each virtual storage controller is operative to perform protocol processing of a first partition of the first protocol stack, the first partition corresponding to the OS/application layer, the first command layer, and the first transport layer of the first protocol stack, and
   wherein the virtualization mechanism is operative to perform protocol processing of a second partition of the first protocol stack, the second partition corresponding to the first link layer and the first physical layer of the first protocol stack.

2. The storage controller of claim 1 wherein each virtual storage controller has an associated command queue that includes a first plurality of command slots, and wherein the set of one or more storage devices has an associated virtual command queue that includes a second plurality of command slots.

3. The storage controller of claim 2 wherein the virtualization mechanism includes a first mapping component operative, at least at some times, to map at least one first command from the first plurality of command slots in the command queue associated with the virtual storage controller, to at least one of the second plurality of command slots in the virtual command queue associated with the set of one or more storage devices.

4. The storage controller of claim 3 wherein the first mapping component is further operative to map the at least one first command from the first plurality of command slots to the at least one of the second plurality of command slots in a round robin manner.

5. The storage controller of claim 2 wherein the virtualization mechanism further includes a second mapping component operative, at least at some times, to map at least one second command from the second plurality of command slots in the virtual command queue associated with the set of one or more storage devices, to at least one of the first plurality of command slots in the command queue associated with the virtual storage controller.

6. The storage controller of claim 5 wherein the second mapping component is further operative to map the at least one second command from the second plurality of command slots to the at least one of the first plurality of command slots in a round robin manner.

7. The storage controller of claim 1 wherein the virtualization mechanism includes a replicating component operative, at least at some times, to replicate at least one packet or frame information structure from the set of one or more storage devices for subsequent transmission through the switch fabric to two or more of the plurality of virtual storage controllers.

8. The storage controller of claim 1 wherein the switch fabric is one of a cross-switch, a cross-point switch, a crossbar switch, and a Peripheral Component Interconnect express (PCIe) switch.

9. The storage controller of claim 1 wherein the first protocol stack is configured to conform to the serial advanced technology attachment (SATA) protocol.

10. A computer system, comprising:
    a system bus;
    the storage controller of claim 1 communicably coupled to the system bus; and
    at least one memory coupled to the system bus.

11. The computer system of claim 10 wherein the storage controller is a serial advanced technology attachment (SATA) controller.

12. The storage controller of claim 1 wherein at least one storage device in the set of one or more storage devices is operative to perform protocol processing of a second protocol stack, the second protocol stack including a device control layer, a second command layer, a second transport layer, a second link layer, and a second physical layer.

13. The storage controller of claim 12 wherein each virtual storage controller is operative to bypass the switch fabric for logically sending one or more command layer signals from the first command layer of the first partition of the first protocol stack to the second command layer of the second protocol stack.

14. The storage controller of claim 12 wherein each virtual storage controller is operative to bypass the switch fabric for logically sending one or more transport layer signals from the first transport layer of the first partition of the first protocol stack to the second transport layer of the second protocol stack.

15. The storage controller of claim 12 wherein the virtualization mechanism is operative to logically send one or more link layer signals from the first link layer of the second partition of the first protocol stack to the second link layer of the second protocol stack.

16. The storage controller of claim 12 wherein the virtualization mechanism is operative to transfer the control and data traffic between the first physical layer of the second partition of the first protocol stack and the second physical layer of the second protocol stack.

17. A method of operating a SATA-compatible storage controller, for use in allowing computers assigned to multiple different computer domains connected by at least one switch fabric to share resources of a common set of storage devices, comprising:

providing a plurality of virtual storage controllers, each virtual storage controller being communicably coupleable to a group of one or more computers assigned to a different one of a plurality of computer domains;

providing a virtualization mechanism communicably coupleable to a set of one or more storage devices;

providing a protocol stack including an operating system (OS)/application layer, a command layer, a transport layer, a link layer, and a physical layer;

routing, by a switch fabric, control and data traffic between each virtual storage controller and the virtualization mechanism;

performing, by one or more of the plurality of virtual storage controllers, protocol processing of a first partition of the protocol stack, the first partition corresponding to the OS/application layer, the command layer, and the transport layer of the protocol stack; and performing, by the virtualization mechanism, protocol processing of a second partition of the protocol stack, the second partition corresponding to the link layer and the physical layer of the protocol stack.

18. The method of claim 17 wherein the virtualization mechanism includes a first mapping component, and wherein the method further comprises:

mapping, at least at some times by the first mapping component, at least one first command from a first plurality of command slots in a command queue associated with one of the plurality of virtual storage controllers, to at least one of a second plurality of command slots in a virtual command queue associated with the set of one or more storage devices.

19. The method of claim 18 further comprising:

performing the mapping of the at least one first command from the first plurality of command slots to the at least one of the second plurality of command slots in a round robin manner.

20. The method of claim 18 wherein the virtualization mechanism further includes a second mapping component, and wherein the method further comprises:

mapping, at least at some times by the second mapping component, at least one second command from the second plurality of command slots in the virtual command queue associated with the set of one or more storage devices, to at least one of the first plurality of command slots in the command queue associated with the respective virtual storage controller.

21. The method of claim 20 further comprising:

performing the mapping of the at least one second command from the second plurality of command slots to the at least one of the first plurality of command slots in a round robin manner.

22. The method of claim 17 wherein the virtualization mechanism includes a replicating component, and wherein the method further comprises:

replicating, at least at some times by the replicating component, at least one packet or frame information structure from the set of one or more storage devices for subsequent transmission through the switch fabric to two or more of the plurality of virtual storage controllers.

* * * * *